Jan. 8, 1929.

C. P. STEINMETZ 1,698,283

MECHANICAL RECTIFIER

Filed Aug. 27, 1923    3 Sheets-Sheet 1

Inventor:
Charles P. Steinmetz;
by
His Attorney.

Jan. 8, 1929.

C. P. STEINMETZ 1,698,283

MECHANICAL RECTIFIER

Filed Aug. 27, 1923      3 Sheets-Sheet 3

Inventor:
Charles P. Steinmetz:
by
His Attorney.

Patented Jan. 8, 1929.

1,698,283

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

MECHANICAL RECTIFIER.

Application filed August 27, 1923. Serial No. 659,457.

My invention relates to mechanical rectifiers for converting alternating current into direct current and vice versa and its object is to provide rectifying apparatus of this class where sparking at the commutator is eliminated.

In carrying my invention into effect I provide between the commutator and the alternating current supply a phase multiplying transformer and provide on said transformer in addition to the usual primary and secondary winding, auxiliary windings so arranged and connected as to largely compensate for the difference in the wave forms of the primary and secondary currents whereby this difference is not reflected as sparking at the brushes. These auxiliary compensating windings may be made comparatively simple by compensating for those portions of the current waves which are removed from the commutation point and then making the brushes of sufficient width to cover the non-compensated portions of the waves.

The features of my invention which I believe to be novel and patentable will be pointed out in the claims appended hereto.

Figure 1:
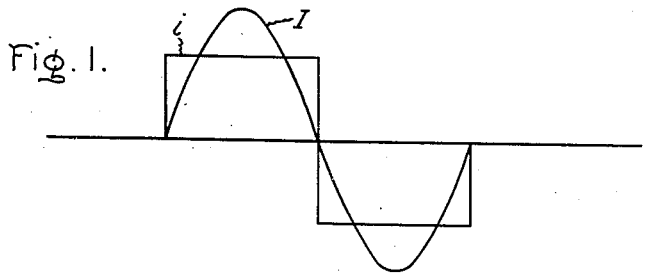
Figure 2:
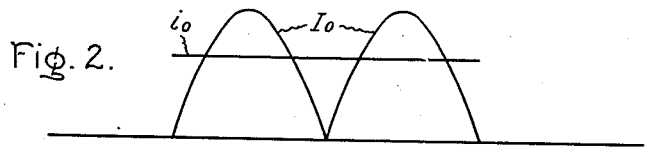
Figure 3:
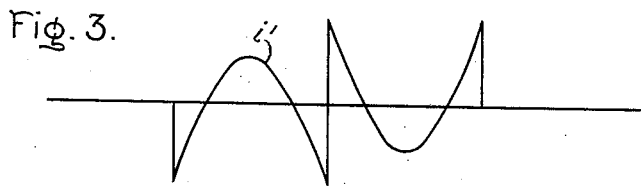
Figure 7:
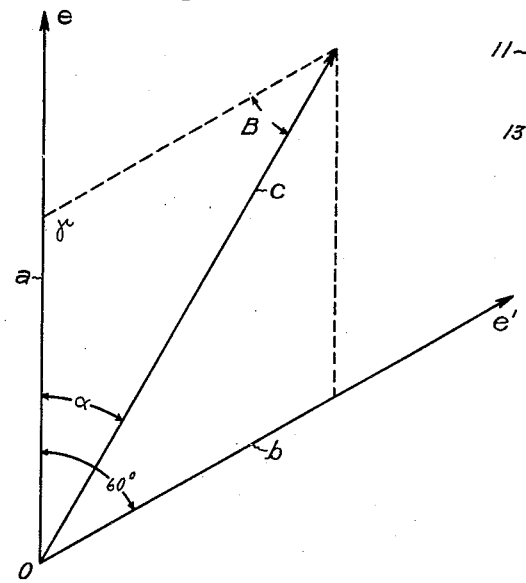
Figure 8:
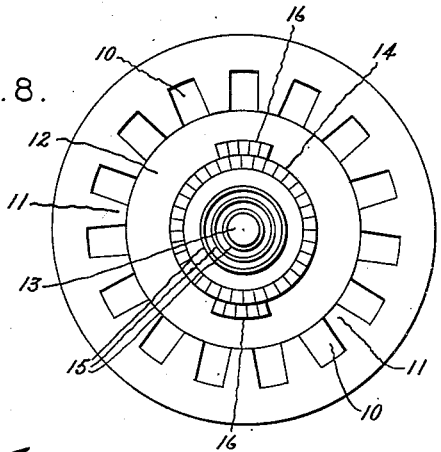
Figure 4:
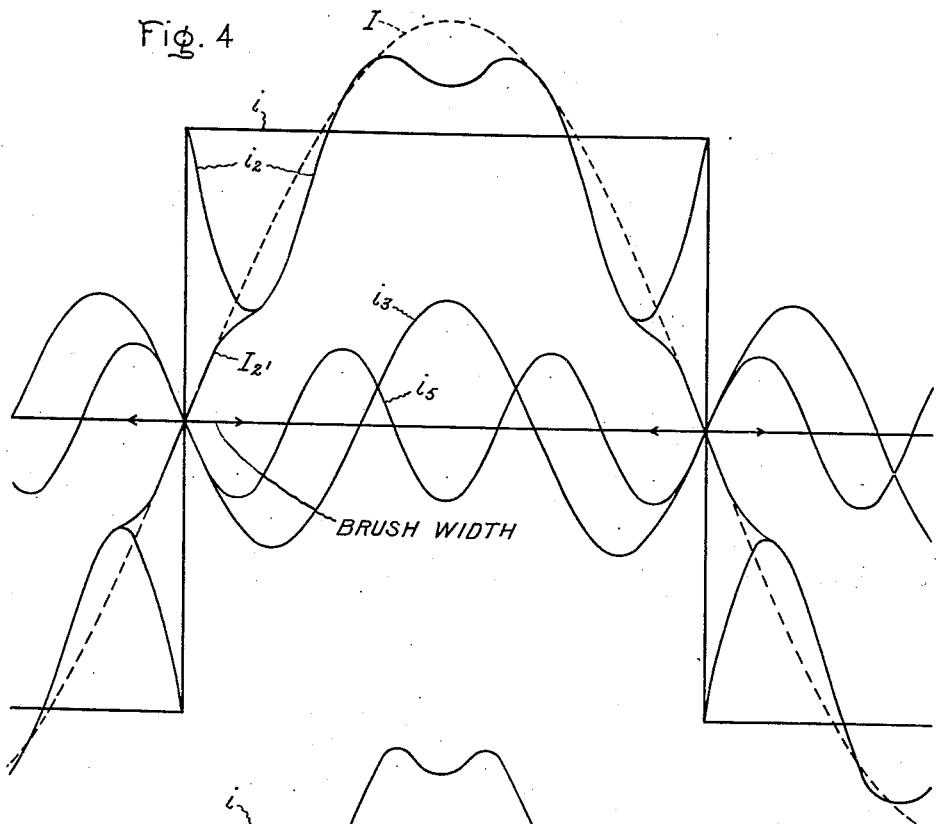
Figure 5:
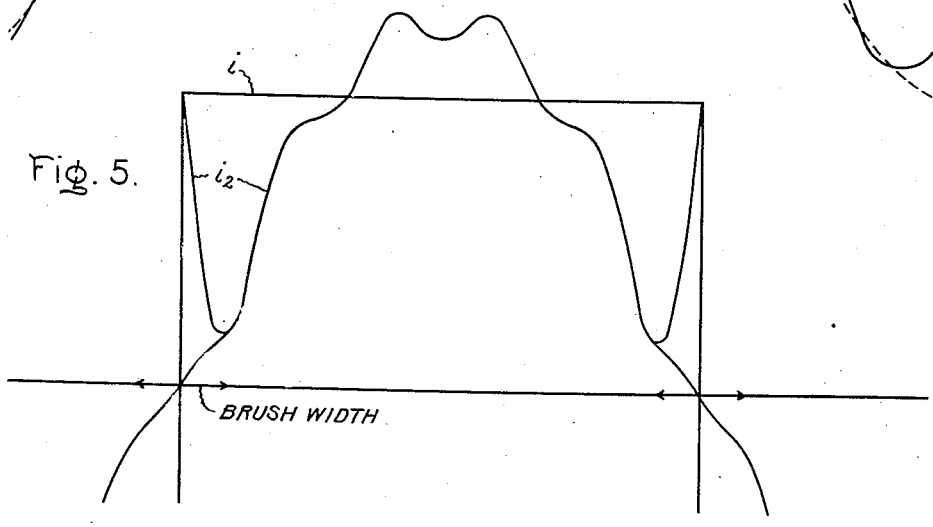
Figure 6:
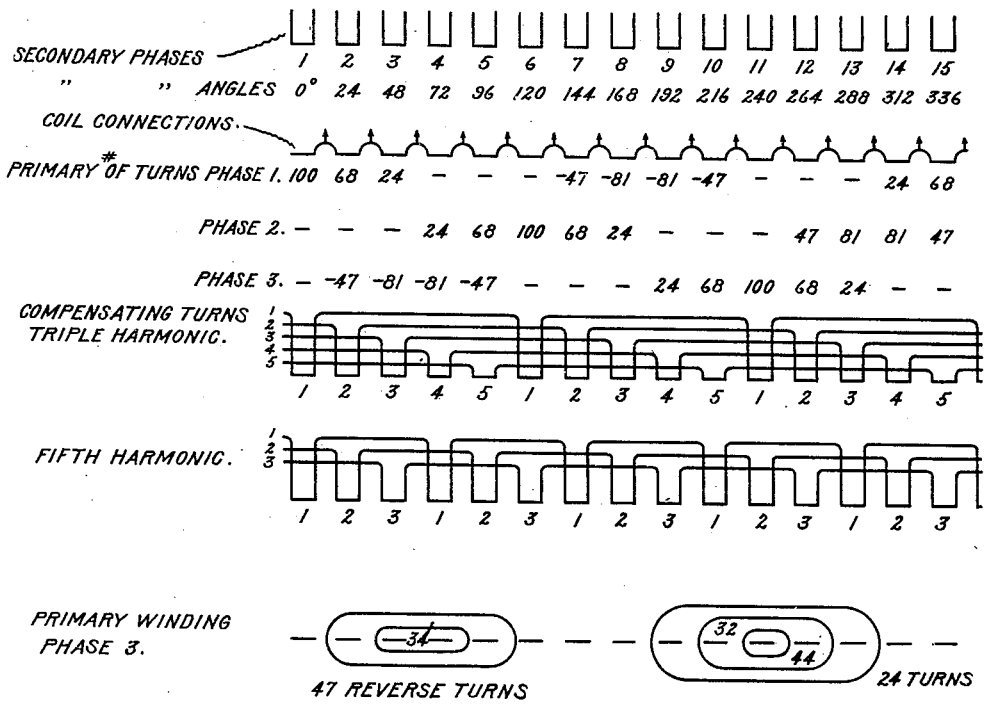

For a better understanding of my invention reference is made to the following explanation taken in connection with the accompanying drawings in which Figs. 1, 2 and 3 are current curves illustrative of the problem to be solved. Figs. 4 and 5 are curves illustrative of the solution of the problem according to my invention; Fig. 6 illustrates the relation of the various coils in a transformer built in accordance with my invention; Fig. 7 is a vector diagram used in calculating the primary coil turns to be used in the various phases and Fig. 8 represents a preferred arrangement of the magnetic circuit of the transformer and its mechanical relation to the commutator.

The limitation of all mechanical rectifiers has been the destructive sparking, which limited their use to small powers. With single phase rectification energy storage is necessary, as the power of the continuous current is constant and that of the single phase alternating current pulsating between zero and double wave. Such energy storage is accomplished by reactance, but reactance greatly increases the destructiveness of sparking by making it inductive. As in the balanced polyphase system the flow of power is constant, a polyphase circuit could be rectified into a continuous current circuit without energy storage, and thus far greater powers would be available in polyphase rectification. Thus for larger units, only polyphase rectification comes into consideration. However, the constancy of polyphase power does not eliminate sparking, but sparking is inherent in the usual method of rectification.

In Fig. 1, I represents one of the phases of a polyphase alternating current. Rectified, this would give the current $I_o$ of Fig. 2. However, the continuous current, which is required—and which is more or less produced by the inductance of the continuous current circuit—is constant, as shown by curve $i_o$ in Fig. 2. This current $i_o$, before rectification, would have to be an alternating current of rectangular shape, shown by $i$ in Fig. 1, that is, reversing instantly from full value to full value in opposite direction. This is not possible, due to the inductance of the alternating current circuit. In other words, the alternating current I must pass through zero twice per cycle, and the direct current $i_o$ cannot pass to zero, thus a differential current, the difference between I and $i$ remains as represented by curve $i'$ in Fig. 3. In the synchronous converter this differential current is by-passed through the converter armature, and determines the size of converter required. In the rectifier, it passes as sparks at the brushes. This inevitable differential current $i'$ thus is the cause of the sparking of all rectifiers.

It must be considered that the alternating current I, or $i$, comes from an alternating current transformer, that is, a closed magnetic circuit, and the inductance, which the differential current $i'$ of the rectifier meets, is thus the closed magnetic circuit exciting inductance of the transformer, representing a reactance of 1000 to 2000% of the normal rated reactance of the transformer, and not the low open magnetic circuit reactance of the converter armature coils. Thus the problem of polyphase rectification is that of the elimination of the differential current. It is obvious that in three phase rectification of considerable power, the three phase system would be transformed into a polyphase system of a much larger number of phases, and these phases connected in ring connection, to give a considerable number of commutator segments and low voltage per segment. Such a transformer would preferably be mounted on the rectifier shaft, so as to require only three collector rings, while otherwise as many collector rings as rectifier phases would be needed.

Assume for instance that we transform from three phases to fifteen phases, supplying a fifteen phase rectifier. Each of the fifteen magnetic circuits of the transformer then contains primary turns of one or two of the three primary phases, and contains a secondary coil. The primary current, or the resultant of the two primary phase currents, is of the form I, Fig. 1, the secondary current is of the form $i$, and while in the transformer the primary ampere turns are equal and opposite to the secondary ampere turns, neutralizing the same—when neglecting the small exciting current—in this transformer there remains a differential magnetomotive force $i - I = i'$, of higher frequency, that is the differential current $i'$ meets the full exciting reactance of the transformer. The rectangular wave of current, $i$, can be resolved into the Fourier series:

$$i = \frac{4}{\pi} i_o \left\{ \sin\phi + \frac{1}{3} \sin 3\phi + \frac{1}{5} \sin 5\phi + \frac{1}{7} \sin 7\phi + \frac{1}{9} \sin 9\phi \ldots \right\}$$

and thus contains a complete series of high harmonics of considerable amplitude. If now $I = i_1 \sin \phi$.

is the primary, or alternating supply current. If the differential current $i'$ is given by $$i' = i - I = \left( \frac{4 i_o}{\pi} - i_1 \right) \sin \phi + \frac{4 i_o}{\pi} \left\{ \frac{1}{3} \sin 3\phi + \frac{1}{5} \sin 5\phi + \frac{1}{7} \sin 7\phi + \ldots \right\}$$

The first term is merely the full frequency exciting current, and the current which makes the inductive trouble in rectification is the higher frequency component which may be expressed thus:—

$$i_a = \frac{4 i_o}{\pi} \left\{ \frac{1}{3} \sin 3\phi + \frac{1}{5} \sin 5\phi + \frac{1}{7} \sin 7\phi + \ldots \right\}$$

According to my invention I place an additional secondary coil around all those magnetic circuits of the transformer, which differ from each other by one third period, as with a fifteen phase transformer the 1st, 6th and 11th, also the 2nd, 7th and 12th, etc., and connect these groups of coils in closed circuits. In these closed circuits of coils 1, 6 and 11, etc. the induced voltages differ by an odd multiple of one phase, that is, are in polyphase relation and their sum is zero, that is, no short circuit current flows, except with the third harmonic (and its higher harmonics, the 9th, 15th, etc.). The third harmonics in these coils are in phase, thus short circuited, and an induced current flows in these coils, rising to such values as to eliminate the third harmonics of magnetic flux, which is produced by the third harmonic of $i_s$. That is, this induced current is:

$$i_3 = -\frac{4 i_o}{3 \pi} \sin 3\phi$$

In the same manner, by putting a second additional coil on each magnetic circuit, which differs by one fifth of a period, and connecting these coils in closed circuits, the fifth harmonic is short circuited and eliminated, by the induced current:

$$i_5 = -\frac{4 i_o}{5 \pi} \sin 5\phi$$

As the third harmonic has one third, the fifth one fifth etc. the value of the fundamental, the third harmonic neutralizing coils require only one third the copper cross section of the main secondary coil, the fifth harmonic neutralizing coils one fifth the copper cross section, the seventh harmonic neutralizing coils one seventh the copper cross section, etc. Thus no uneconomically large amount of winding is required.

It is required however that the number of secondary phases is at least the least common multiple of the orders of the harmonics, which should be neutralized where two or more harmonics are to be eliminated. Thus, a 15 phase rectifier neutralizes the 3rd and 5th harmonic (and the 9th, 15th, etc.). To neutralize also the 7th harmonic requires $3 \times 5 \times 7 = 105$ phases. This would be quite feasible economically with a large unit rectifier. For smaller units, a fifteen phase arrangement will be sufficient. With a 105 phase secondary, the following harmonics are neutralized: 3, 5, 7, 9, 15, 21, 25, 27, etc. thus only the following harmonics remain: 11, 13, 17, 19, 23, 29, etc. and the intensity of the differential current thus is reduced to less than one quarter of its previous value.

However, this does not fully indicate the advantage derived, as the remaining harmonics have become harmless, by being limited to a narrow time element at the current reversal, where they are short circuited by the brushes. This is best shown by plotting the total secondary current,—

$$i_2 = i + i_3 + i_5$$

and comparing it with the primary current I.

Without phase compensation, the secondary current and likewise the resulting magnetomotive force is $i$, Fig. 4, corresponding to the primary current I, thus giving a large differential current. Adding however $i_3$ and $i_5$ (Fig. 4), which may be considered the magnetomotive forces produced by the induced currents in the third harmonic and fifth harmonic neutralizing coils of a fifteen phase rectifier, to $i$, gives the resultant magnetomotive force wave $i_2$. As seen, $i_2$ is a good alternating current wave, except in the range from $-20°$ to $+20°$ at the current reversal points. By giving the brush short circuit at reversal a width of 40 electrical degrees, the remaining portion of the magnetomotive force waves produced by the primary current and secondary current as thus compensated in the transformer assume the same shape, that is, the self-inductive reactance entirely disappears, while the difference between $i_2$ and $i$ or $i_2'$ corresponds to the current under the brushes, during reversal. The alternating wave $i_2$ then has the typical shape of a moderate 7th harmonic distortion, which is harmless.

Fig. 5 shows the resultant secondary wave of a compensated 105 phase rectifier, having all harmonics eliminated up to the 11th. In this case, the brushes would have a short circuiting width of 30 electrical degrees.

It follows herefrom, that by the choice of the proper number of secondary phases in a mechanical rectifier, and the use of auxiliary secondary coils connected in closed circuit, the magnetomotive force of the rectangular wave of rectified current can be changed to a resultant secondary magnetomotive force of a shape which is reducible by the primary current, and the differential current between the rectangular rectifier current and the primary polyphase current thus can be substantially eliminated, that is, the current made non-inductive, as far as rectification is concerned.

Fig. 6 illustrates the magnetic and electrical dispositions of a fifteen phase rectifier designed in accordance with my invention.

The first line represents the 15 magnetic phases, differing from each other by 24°. The next line shows the connection of the 15 secondary coils in closed circuit, that is, ring connection, the leads to the commutator segments being brought out between successive coils as indicated by the arrows.

Next then are given the number of turns of the three primary phases, required to give a symmetrical 15 phase system, and derived by the parallelogram of sine waves. (See Steinmetz book on Alternating Current Phenomenon, 4th edition 1903, Chap. IV).

That is, if, in Fig. 7, $e$ is one of the three primary phases and $e'$ the reverse of another primary phase, thus angle $e \, O \, e' = 60°$, the secondary phases make with $e$ the angles 0, 24° and 48°, and thus are composed of the following number of turns of $e$ and $e'$: $c$ turns of $e$, and none of $e'$ where the secondary phase coincides with the primary.

$$a = \frac{c \sin B}{\sin \gamma} \text{ turns of } e$$

$$b = \frac{c \sin a}{\sin \gamma} \text{ turns of } e'$$

where $\gamma = 60°$, $a = 24°$ and $48°$, respectively, and $B = 36°$ and $12°$ respectively.

Next in Fig. 6 then are given the connections of the triple harmonic neutralizing coils, and next the connection of the fifth harmonic neutralizing coils.

Finally are given the number and the location of the primary coils of one phase, required to give the proportions derived above by the parallelogram of sine waves.

It is obvious that the secondary turns would not be located, as diagrammatically indicated in Fig. 6, each surrounding one magnetic circuit only, but would be placed around a number of circuits, for instance 1 to 4, 2 to 5 etc., so as to enclose more flux, and the same would then apply to the neutralizing coils.

Constructively, the magnetic circuit is preferably made circular as diagrammatically illustrated in Fig. 8, like an induction motor primary, with fifteen large slots 10 separated by fifteen inwardly projecting teeth 11. The coils would be led into the slots, and then the magnetic return inserted, as an internal laminated cylinder 12, without slots and without air gap. That is, like a fifteen slot induction motor without air gap and without slots and windings on the armature. This structure is preferably mounted on a shaft 13 which also carries the rectifier commutator 14 and slip rings 15 suitably connected to secondary and primary windings respectively. Each direct current brush 16 is preferably made up of several brushes suitably staggered so as to function properly and yet cover the required commutator arc.

Into the fifteen slots 10 are placed five primary coils per phase, in the manner as shown in the lower line of Fig. 6, and 15 secondary coils, see top line of Fig. 6, each covering a sufficient number of slots to enclose considerable flux, without giving too long end connections.

Each secondary coil section consists of three coils: the true secondary coil, which in ring connection connects to the commutator, the triple harmonic coil and the fifth harmonic coil, both wound as close as possible to the true secondary coil (one at each side for instance), but well insulated therefrom, and of at least of 1/3 and 1/5 the true secondary coil copper cross section respectively, and connected in closed circuit as shown in diagram Fig. 6.

The rectifier will be rotated with respect to the brushes in synchronism with the alternating current supply in any suitable manner, as for example by a small synchronous motor.

In the appended claims, the windings of the transformer which are to be connected to the alternating current circuit and to the commutator respectively are termed primary and secondary windings respectively, irrespective of whether the apparatus is to be used to convert alternating current to direct current or vice versa. All of the circuits for compensating a given harmonic are termed a compensating winding.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:—

1. Apparatus for transforming electric current comprising a phase multiplying transformer having main primary and secondary windings, the latter having $nx$ phases, a rectifying commutator electrically connected to said secondary winding, a secondary compensating winding for eliminating the $n$th harmonic of the fundamental flux wave of said transformer, a secondary compensating winding for eliminating the $x$ harmonic of said wave, said first mentioned compensating winding comprising closed circuits each circuit containing $x$ coils spaced on the core $n$ secondary phases apart.

2. Apparatus for transforming electric current comprising a phase multiplying transformer having main primary and secondary windings, the latter having $3x$ phases, a rectifying commutator electrically connected to said secondary winding, a secondary compensating winding on said transformer for eliminating the 3rd harmonic of the primary flux wave of said transformer, a secondary compensating winding on said transformer for eliminating the $x$th harmonic of said wave, the first mentioned compensating winding comprising $x$ closed circuits each containing 3 coils evenly distributed with respect to the primary flux wave and the second mentioned compensating winding comprising 3 closed circuits each containing $x$ coils evenly distributed with respect to the primary flux wave, $x$ being a number greater than 3.

3. Apparatus for transforming electric current comprising a phase multiplying transformer, a commutator electrically connected to the main secondary winding of said transformer, direct current brushes bearing on said commutator and secondary compensating coils on said transformer arranged to distort the magnetomotive force wave form produced by the main secondary current of said transformer so that it substantially conforms to the primary current magnetomotive force wave form at points removed from the zone of commutation, the brushes on said commutator being of sufficient width to commutate the remaining portion of the corresponding secondary current wave.

4. Rectifying apparatus comprising a rectifying commutator, a phase multiplying transformer, the main secondary winding of which is connected to said commutator and contains 15 phases, secondary compensating windings on said transformer for eliminating the 3rd and the 5th harmonics of the fundamental flux wave of the transformer and direct current brushes bearing on said commutator at the commutation points, said brushes having a width of substantially 40 electrical degrees.

5. The method of rectifying a commercial polyphase alternating current by means of a mechanical rectifier so as to eliminate sparking which consists in multiplying the phases of said alternating current by means of a phase multiplying transformer, distorting the magnetomotive force wave form produced by the secondary current of said transformer so that said secondary wave form stubstantially conforms to the primary magnetomotive force wave form only at points removed from the zone of commutation and commutating the remaining portions of the corresponding secondary current wave.

6. Apparatus for transforming electrical energy comprising a shaft, a phase multiplying transformer mounted on said shaft having an inner core and an internally slotted outer magnetic circuit closely fitting over said inner core, main primary and secondary windings in said slots, compensating secondary windings in said slots closely inductively related to said main secondary winding, a commutator on said shaft connected to said main secondary winding, direct current brushes bearing on said commutator and slip rings on said shaft connected to said primary winding.

7. A phase multiplying transformer comprising a magnetic core having a number of magnetic circuits corresponding to the number of secondary phases, main primary and secondary windings on said core and secondary compensating windings for eliminating a plurality of different harmonic components of the fundamental flux wave of said transformer, each such winding comprising a series of closed circuits, each circuit containing coils spaced on the core so that the component fluxes which such windings are to eliminate are in phase in said coils, the number of phases of the main secondary winding being at least the least common multiple of the orders of the harmonics to be eliminated.

In witness whereof, I have hereunto set my hand this 24th day of August, 1923.

CHARLES P. STEINMETZ.